Sept. 2, 1930.   R. S. TROTT   1,774,773
ROTARY VALVE FOR ENGINES
Filed Nov. 26, 1928   2 Sheets-Sheet 2

INVENTOR.
Rolland S. Trott

Patented Sept. 2, 1930

1,774,773

UNITED STATES PATENT OFFICE

ROLLAND S. TROTT, OF DENVER, COLORADO

ROTARY VALVE FOR ENGINES

Application filed November 26, 1928. Serial No. 321,937.

My invention relates to rotary valves for internal combustion engines.

The object of my invention is to provide a rotary valve construction in which the lubrication may be taken care of by a circulating oil system.

A further object is to provide a valve construction in which the oiling system and the intake and exhaust passages are so constructed as to provide perfect lubrication while maintaining at a minimum the introduction of oil into said passages.

A further object is to provide a rotary valve having no circumferential ports whatever.

A further object is to provide such a valve in which there can be no harmful interference or connection between the exhaust and intake passages under any condition.

I attain the above objects by providing a valve construction in which the intake and exhaust passages extend from the lower packing face of the valve through the valve axially, leakage from the cylinder being prevented by a sealing ring bearing against the packing face of the valve, and leakage from the portions of the passages at any time not covered by the ring being prevented by a sealing plate, and by providing other features of construction which are illustrated in the drawings, in which:—

Figure 3 is an end view of the rotary valve, seen from below.

Figure 6 is a diagrammatic view of the engine and oiling system.

Figure 1:
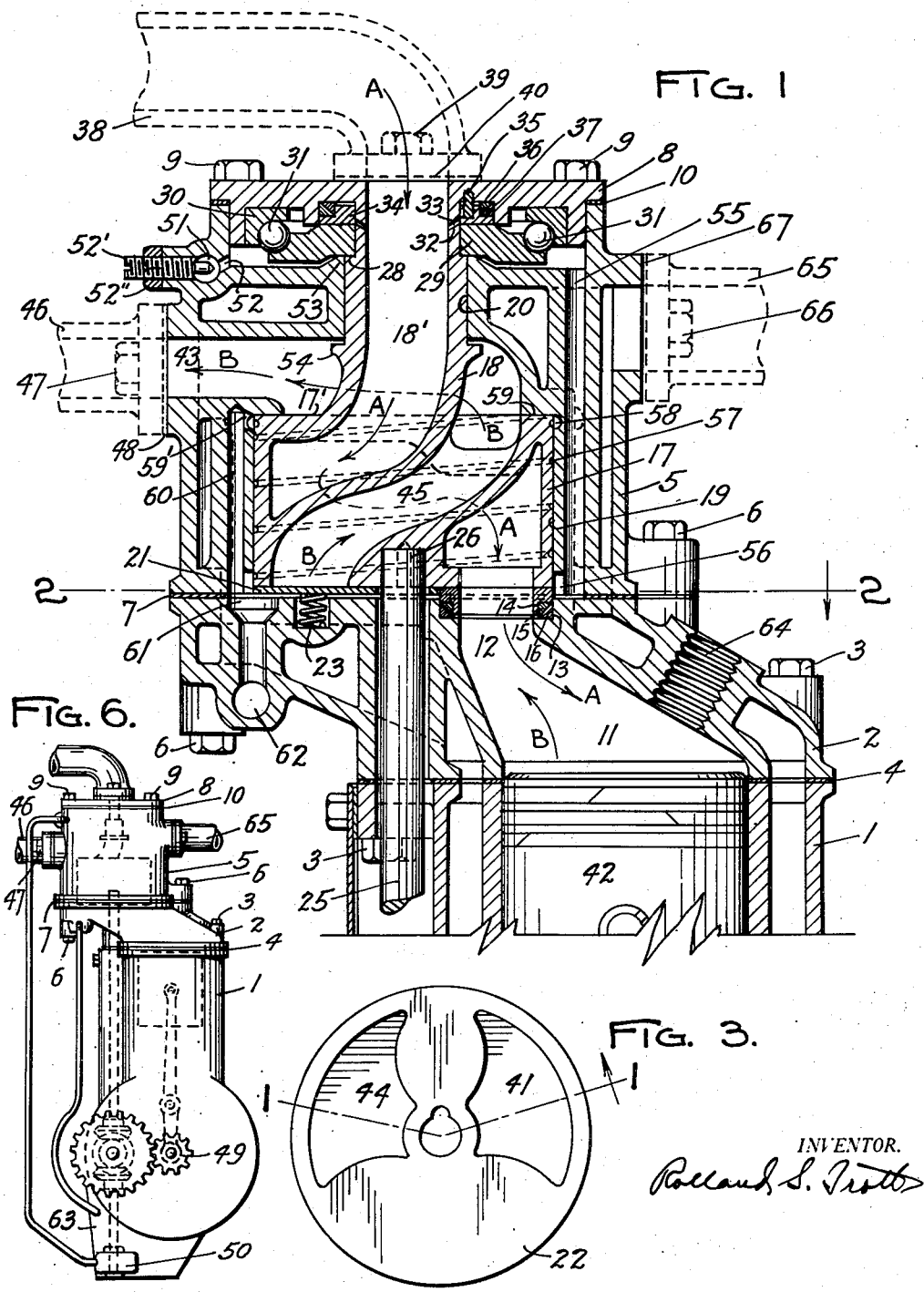
Figure 1 is a fragmentary transverse sectional view through my rotary valve and a portion of the engine upon which it is mounted, the section of the valve being taken on the line 1—1 of Figure 3.

The engine cylinder 1 is provided with the cylinder head 2, connection between them being made by the capscrews 3, and the joint being made tight by the usual gasket 4.

The rotary housing 5 is adapted to fit upon the cylinder head 2, connection between them being made by the capscrews 6, and the joint being made tight by the usual gasket 7.

The rotary housing 5 is provided with the housing cover 8, connection between them being made by the capscrews 9, the joint between them being made tight by the gasket or shim 10, and the spacing between them being varied as desired by the thickness of the gasket or shim 10, as will be taken up more fully later on.

The cylinder head 2 is provided with the compression space 11, which converges to the counterbored port 12.

The counterbore 13 of the port 12 is adapted to receive the compound sealing ring shown, which is called the cylinder sealing ring and is composed to the smooth faced solid ring 14, and the inner and outer split rings 15 and 16 respectively.

The spring action of the outer split ring 16 causes it to fit closely against the inner wall of the counterbore 13, and the spring action of the inner split ring 15 against the bevel of the ring 16 and against the ring 14 forms a seal between them, and puts an endwise pressure upon them both, forcing the ring 16 down against the bottom of the counterbore 13 and forcing the ring 14 up against the lower face 22 of the rotary valve.

Any other form of sealing ring may be used in the counterbore 13 so long as it provides resilient radial and longitudinal action which will form a seal against leakage either between or about the parts of the ring.

The rotary valve is provided with a lower enlarged portion 17 and an upper portion 18 of smaller diameter.

The portion 17 has a free running fit in the bore 19 of the rotary housing 5, and the portion 18 passes through the bore 20 of the housing 5.

The sealing plate 21 fits against the lower face 22 of the rotary valve and is resiliently held in contact therewith by the sealing plate springs 23, which are received by counterbores in the upper face of the cylinder head 2.

Figure 2:
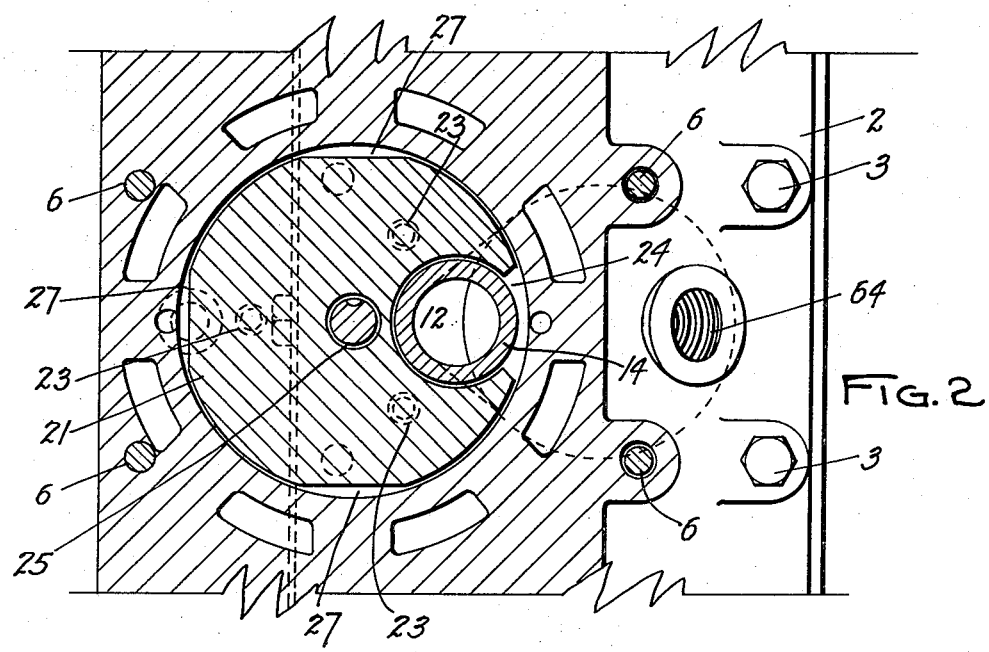
Figure 2 is a section on the line 2—2 of Figure 1.
Figure 5:
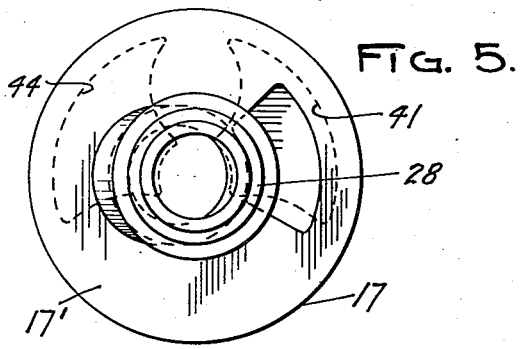
Figure 5 is an end view of the rotary valve seen from above.
Figure 4:
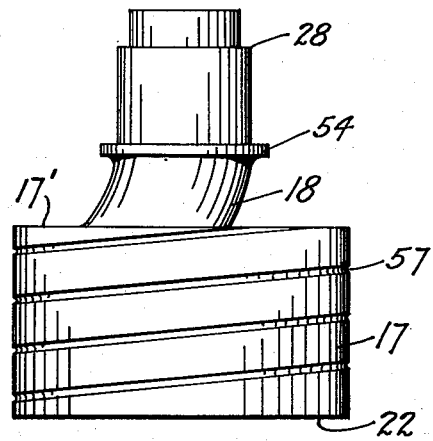
Figure 4 is an elevation of the rotary valve.

The sealing plate 21 is provided with a notch or aperture 24 (see Figure 2) through which fits the solid ring 14, which prevents rotation of the plate 21.

The plate 21 is also provided with a central aperture through which extends the shaft 25. The shaft 25 is received in the central hole in the rotary valve face 22 and is keyed therein by the key 26. A splined shaft co-operating with a hole in the rotary made to receive it, may be used in place of the key construction if desired.

The sealing plate 21 is provided with notches or flattened portions 27, which will be taken up more fully later on.

The upper portion 18 of the rotary valve is provided with a shoulder 28 against which rests the ball bearing cone and oil thrower 29; see Figure 1.

The ball bearing cup 30 is mounted in the housing cover 8, and through the balls 31 and the cone 29 positions the rotary valve axially in the housing 5, adjustment of the position of the valve being made by variation in the thickness of the gasket or shim 10.

The portion 18 of the rotary valve is provided with a central passage 18', connecting with the interior of the portion 17.

The upper face of the portion 18 has an inward bevel 32 in spaced relation with the co-acting bevel 33 of the housing cover 8.

The solid ring 34 bears against the upper face of the cone 29 and is prevented from turning with respect to the housing cover 8 by the pin 35. The inner and outer split rings 36 and 37 respectively, together with the solid ring 34, form what is called the intake sealing ring, which is adapted to fit closely in a groove in the housing cover 8. The action of this sealing ring is similar to that of the cylinder sealing ring. It prevents oil being sucked into the intake passage, and in the case of the use of a supercharger it prevents leakage out of the intake passage at this point.

To the housing cover 8 is attached any proper intake manifold, one form of which is shown as at 38, in Figure 1, by dotted lines.

The attachment may be made by capscrews such as shown at 39, the joint being made tight by the gasket 40.

The rotary valve is provided in its lower face 22 with an intake port 41, adapted to register with the cylinder port 12 through the cylinder sealing ring, at each revolution of the valve. This registration of the port 41 with the port 12 is adapted to take place during the intake stroke of the piston 42. The angular extent and position of the port 41 determines the timing of the valve, that is, the lead or lag of its opening and its closing.

The charge passes from the intake manifold 38, through the passage 18' of the portion 18 through the hollow portion 17, and through the port 41 and ring 14 to the cylinder.

This course of the incoming charge is indicated by the arrows A in Figure 1.

The housing 5 is provided with an exhaust passage 43, surrounding the portion 18 of the rotary valve and adapted to connect with the exhaust port 44 in the lower face 22 of the valve through the exhaust passage 45, which passes through the portion 17 of the valve.

The rotation of the valve brings the port 44 to register with the ring 14 and the cylinder port 12 once every revolution during the exhaust stroke of the piston 42. The timing of the exhaust, that is the lead or lag of its opening and closing, is determined by the angular position and extent of the port 44.

The exhaust passage 43 connects with some such exhaust manifold as shown by dotted lines at 46, the attachment being made as by the capscrews 47, and the fit made tight between the manifold 46 and the housing 5 by the gasket 48. The path of the exhaust gases is indicated by the arrows B.

The rotary drive shaft 25 is adapted to be driven from the crankshaft 49 by gears as shown or by any other proper mechanical arrangement that will rotate the rotary valve at one half the crankshaft speed, so as to provided for the four cycle operation of the engine.

Oil is pumped by any proper pump 50 to the oil supply passage 51, from which it passes to each thrust ball bearing by a passage 52.

The raised hub 53 of each valve unit of the engine, combined with the oil thrower effect of the cone 29 prevents oil from working down along the outside of the portion 18 of the rotary valve and into the exhaust passage 43.

While the beveled shoulder 54 of the portion 18 tends to prevent the exhaust gas from leaking upward along the portion 18 and into the bearing pocket, the fact that the bearing pocket is closed will also tend to prevent such leakage.

The oil in contact with the ball bearing will be splashed around and will lubricate the intake sealing ring, although the oil thrower or centrifugal effect of the contact of the solid ring 34 with the cone 29 will prevent any actual flow of oil into the intake passage 18'. And the downwardly extending bevels 32 and 33 and the downward draft of the incoming charge will prevent any gasolene liquid or vapor from leaking past the intake sealing ring into the bearing pocket.

The oil from the bearing pocket drains down through the passage 55 to the counterbore 56 of the bore 19 of the rotary housing 5.

The oil feeds down below the sealing plate 21 by means of the aperture 24 and the notches 27, but is distributed over the lower face 22 of the valve by the slow creep of the solid ring 14 in the counterbore 13.

The rotation of the rotary valve combines with the spiral groove 57 on its outer face to work oil from the counterbore 56 upward along the walls of the bore 19 to the counterbore 58, thus thoroughly lubricating the walls of the portion 17 of the rotary and of the bore 19.

A spiral groove in the inner face of the bore 19 may be provided if desired, either in place of or in addition to the spiral groove 57, and adapted to either oppose or assist the oil-moving action of the groove 57 as the requirements of any particular case may dictate.

The oil thrower or centrifugal effect of the upper face 17' of the portion 17, rotating adjacent the shoulder 59 between the bore 19, and the exhaust passage 43, prevents oil from flowing through into the exhaust passage, although the constant presence of the oil will keep the surfaces lubricated.

The oil from the counterbore 58 passes through the hole 59' to the drain passage 60 where it drains downward into the drain counterbore 61 in the upper face of the cylinder head 2 and from there on down to the return passage 62 and to the sump 63.

The pump 50 may be a special pump for the lubrication of the valve mechanism only, or may be the usual pump, only a portion of whose discharge is used for the supply of oil to the valve mechanism.

The exact means, in fact, by which a supply of oil is maintained in the supply passage 51 is immaterial, so long as it is positive and reliable, and preferably under only a small pressure.

The amount of oil circulated to each valve may be adjusted by the adjusting valve 52', the adjustment being locked by the lock nut 52''.

It will be noted that the passage 52 is small, and that the passage 55 is much larger, since there should be little if any pressure on the oil in the bearing pocket, as all that is required is a certain and continual supply of oil.

The size of the return oil passage 62 is also much larger than the size of the passage 55, which makes it all the more certain that the oil below the rotary face 22 is not under pressure at any time; and since the drain passages 55 and 60 and the passage under the plate 21 are much larger in capacity than the spiral groove 57, there can be no pressure on the oil at the upper end of the spiral groove 57 or at the upper end of the portion 17 of the valve.

That is, the oiling system provides a continual over-supply of oil circulating under little or no pressure, so that lubrication will be insured with only the minimum of loss through the ports 12, 41 and 44, and the passage 43.

The cylinder and intake sealing rings, the sealing plate 21, and the oil thrower effect of the cone 29 and of the upper face 17' of the portion 17 of the rotary valve, all combine to prevent oil from getting into the intake and exhaust passages, though its constant presence insures the necessary lubrication.

The usual spark plug is to be provided for the threaded opening 64, and the cooling water is to be supplied in the usual manner through a manifold (not shown) to the water jacket of the cylinder 1, and is to be removed from the water jacket through the usual manifold as indicated by dotted lines at 65, the attachment being made as by the capscrews 66, and the fit made tight by the gasket 67.

Figure 7:
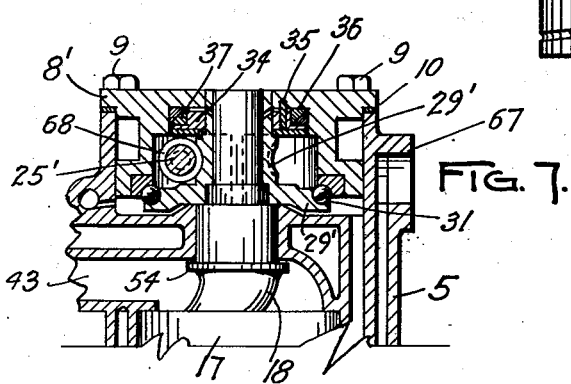
Figure 7 is a fragmentary section similar to Figure 1 but indicating a modified form of drive for the rotary valve.

In the modified form shown in Figure 7, the cone 29' is provided with a worm gear and is rotated by the worm 68 on the shaft 25'.

The lubrication system may be substantially the same as shown in Figure 1, with any modifications desired to suit any special set of conditions.

Obviously, either air or water cooling may be applied to either construction shown, as is the case with engines having the ordinary type of valve construction.

It will now be seen that by the above described constructions, all the objects sought have been attained.

A circulating oil system is provided for the valve mechanism, without permitting the lubricating oil to escape in quantities into the exhaust and intake passages; there are no circumferential ports in the rotary valve with their resulting large oil losses, and there is no harmful interference or connection between the intake and exhaust passages, the only connection being that provided by some valve timings in which there may be an overlap of the events of the cycle, if desired, as is the case with the ordinary type of valve construction.

I am aware that many modifications in construction and design features are possible in my invention to adapt it to special conditions and requirements, and which any competent mechanic or designer would readily perceive once my invention were disclosed to him, so I do not wish to limit my protection narrowly to the exact forms and constructions described and illustrated, but what I claim as new, and desire to protect by Letters Patent, is as follows:—

1. In a rotary valve mechanism, a housing having a cylindrical bore terminating in an end wall substantially square with the bore and having an off-center counterbored port, a cylindrical valve adapted to rotate in the housing bore and having a packing face square with the axis of the valve and adjacent the said end wall and provided with off-center intake and exhaust ports adapted to register with the port of said end wall as the valve revolves, a sealing ring in the counterbore of said port adapted to have resilient contact with the packing face, an apertured plate adapted to receive the sealing ring through its aperture and positioned between the said end wall and the said packing face, and resilient means adapted to hold the plate in contact with the packing face.

2. In a rotary valve mechanism, a housing having a cylindrical bore terminating in an end wall substantially square with the bore and having an off-center counterbored port, a cylindrical valve adapted to rotate in the housing bore and having a packing face square with the valve axis adjacent said end wall and provided with off-center intake and exhaust ports adapted to register with the port of said end wall as the valve revolves, a sealing ring in the counterbore of said port adapted to have resilient contact with the packing face, an apertured plate adapted to receive the sealing ring through its aperture and positioned between the said end wall and the said packing face, resilient means adapted to hold the plate in contact with the packing face, the valve being provided at its other end with a central port connecting with the intake port of the packing face, and with an off-center port connecting with the exhaust port of the packing face, the housing being provided with passages registering with said ports, and means adapted to rotate said valve.

3. In a rotary valve mechanism, a cylindrical valve having at one end a packing face square with the valve axis and provided with off-center intake and exhaust ports, and at the other end a face square with the valve axis and having a passage connecting with the said exhaust port, and a central extension of reduced diameter provided with a passage connecting with said intake port, and adapted to receive an alignment bearing, and a housing adapted to receive the valve and provided with an off-center counterbored port adapted to register with the ports of the packing face, and with passages adapted to register with the passages of the valve and adapted to receive said bearing and thereby position said valve, a sealing ring in the counterbore of said off-center port in the housing adapted to have resilient contact with the packing face of the valve, a plate in said housing adapted to contact said packing face, and resilient means supported by said housing and adapted to force said plate against said packing face.

4. In a rotary valve adapted to co-operate with an engine having a crankshaft, a cylinder, a piston connected to the crankshaft and adapted to reciprocate in the cylinder, a cylindrical valve having at one end a packing face square with the valve axis and provided with off-center intake and exhaust ports, and at the other end a face square with the valve axis and having a passage connecting with said exhaust port, and a central extension of reduced diameter provided with a passage connecting with said intake port and adapted to receive an alignment bearing, and a housing adapted to receive the valve and provided with an off-center counterbored port adapted to register with the ports of the packing face, and with passages adapted to register with the passages of the valve and adapted to receive said bearing and thereby position said valve, a sealing ring in the counterbore of said off-center port adapted to have resilient contact with the packing face of the valve, a plate in said housing adapted to contact said packing face, and resilient means supported by said housing and adapted to force said plate against said packing face, and means driven by the crankshaft and adapted to rotate the valve once for each two revolutions of the crankshaft.

5. In a rotary valve mechanism adapted to co-operate with an internal combustion engine for the control of the fuel charge and of the products of combustion, a cylindrical valve having at one end a packing face square with the valve axis and provided with off-center intake and exhaust ports and at the other end a face square with the valve axis and having a passage connecting with the exhaust port of the packing face and a central extension of reduced diameter provided with a passage connecting with the intake port of the packing face and adapted to mount an alignment bearing.

6. In a rotary valve mechanism adapted to co-operate with an internal combustion engine for the control of the fuel charge and of the products of combustion, a cylindrical valve having at one end a packing face square with the valve axis and provided with off-center intake and exhaust ports and at the other end a face square with the valve axis and having a passage connecting with the exhaust port of the packing face and a central extension provided with a passage connecting with the intake port of the packing face, and adapted to mount an alignment bearing and provided with means for the engagement of means to rotate the valve.

7. In a rotary valve having a ported packing face square with the valve axis, and adapted to co-operate with a sealing ring in the counterbore of a port adapted to register with the ports of said packing face, a sealing plate adapted to straddle said sealing ring and bear against said packing face, and resilient means adapted to bear against said plate and force its engagement with said face.

8. In a rotary valve mechanism, a cylindrical valve having at one end a packing face square with the valve axis and provided with off-center intake and exhaust ports, and at the other end a face square with the valve axis and having a passage connecting with the said exhaust port, and a central extension of reduced diameter provided with a passage connecting with said intake port and with a packing face square with the valve axis, and adapted to receive an alignment bearing, a sealing ring adapted to resiliently bear against the face of said extension, a housing adapted to receive the valve and provided with an off-center counterbored port adapted to register with the ports of the ported packing face, and with passages adapted to register with the passages of the valve and adapted to receive said bearing and thereby position said valve, and to receive said sealing ring, means to prevent the rotation of the sealing ring with respect to the housing, a sealing ring in the counterbore of said off-center port in the housing adapted to have resilient contact with the packing face of the valve, a plate in said housing adapted to contact said ported packing face, and resilient means supported by said housing and adapted to force said plate against said packing face.

9. In a rotary valve adapted to co-operate with an engine having a crankshaft, a cylinder, a piston connected to the crankshaft and adapted to reciprocate in the cylinder, a cylindrical valve having at one end a packing face square with the valve axis and provided with off-center intake and exhaust ports, and at the other end a face square with the valve axis and having a passage connecting with said exhaust port, and a central extension of reduced diameter provided with a passage connecting with said intake port and with a packing face square with the valve axis, and adapted to receive an alignment bearing, a sealing ring adapted to resiliently bear against the face of said extension, a housing adapted to receive the valve and provided with an off-center counterbored port adapted to register with the ports of the ported packing face, and with passages adapted to register with the passages of the valve and adapted to receive said bearing and thereby position said valve, and to receive said sealing ring, means to prevent the rotation of the sealing ring with respect to the housing, a sealing ring in the counterbore of said off-center port adapted to have resilient contact with the ported packing face, a plate in said housing adapted to contact said packing face, resilient means supported by said housing and adapted to force said plate against said packing face, means driven by the crankshaft and adapted to rotate the valve once for each two revolutions of the crankshaft, means adapted to supply oil from the base of the engine to said valve mechanism, and means to drain oil from said valve mechanism to said base.

10. A rotary valve having a ported packing face square with the valve axis, the ports of which are successively aligned with a co-acting cylinder port in a wall adjacent said face as the valve rotates, a circular sealing member concentric with said cylinder port and resiliently bearing against said packing face, a substantially stationary sealing plate bearing against said packing face and separate from said sealing member, and resilient means adapted to bear against said plate and force its engagement with said face.

11. A rotary valve adapted to rotate in a housing provided with a port and having a ported packing face square with the valve axis, a substantially stationary packing plate in resilient contact with said face, and a circular sealing member within the periphery of said plate and resiliently bearing against said face and against said housing concentric with the port thereof.

12. A rotary valve adapted to rotate in a housing provided with ports and having a ported packing face square with the valve axis, a substantially stationary packing plate in resilient contact with said face, and a circular sealing member within the periphery of said plate and in resilient contact with said face and with said housing concentric with one of its ports.

13. A rotary valve adapted to rotate and provided with a ported packing face square with the valve axis, a circular member in resilient contact with said face and registering with the ports thereof, and a plate separate from said sealing means and in resilient contact with said face, and of substantially the same diameter.

14. A rotary valve having a passage therethrough terminating in a face port in a packing face square with the axis of the valve, a wall adjacent said face provided with a wall port adapted to align with said face port as the valve rotates each revolution, and means adapted to prevent leakage from said ports composed of a circular sealing member concentric with said wall port and in resilient contact with said wall and with said face, a substantially stationary sealing plate separate from said member and through which said member passes, bearing against said face, and resilient means bearing against the wall and against the plate.

15. A rotary valve adapted to rotate in a housing having a transverse wall provided with a wall port, the valve having a passage terminating in a face port in a packing face square with the axis of the valve and adjacent said wall, means to prevent leakage from said ports and joining them at each revolution of the valve and composed of a circular sealing member concentric with said wall port and in resilient contact with said face, and a substantially stationary sealing plate through which said member passes bearing against said face, and resilient means bearing against the wall and the plate.

16. In combination, a rotary valve having a transverse ported face, a valve housing in which said valve rotates provided with a ported face adjacent the transverse face of the valve, a substantially stationary plate, in resilient contact with the valve face, and ported sealing means in resilient contact with the valve face and adapted to connect the ports of the valve and of the housing as the valve rotates.

17. In combination, a transverse ported face of a rotary valve, an adjacent ported wall of a valve housing in which the valve rotates, a substantially stationary plate in resilient contact with the face of the valve, and ported sealing means non-revoluble with respect to the housing axis and in contact with the face of the valve and adapted to join the ports of the two faces as the valve revolves.

18. A rotary valve adapted to rotate in a ported housing and to control the passages thereof and provided with a ported transverse packing face, ported sealing means in resilient contact with said transverse face and registering with the ports thereof as the valve rotates, and a plate separate from said sealing means and in resilient contact with said face.

19. In combination, a transverse ported face of a rotary valve, a substantially stationary plate having a substantially circular aperture therethrough in resilient contact with said face, and a ring in the aperture of the said plate and in resilient contact with said face, whereby communication may be established with said transverse ported face only through said ring.

20. A sealing construction for the transverse ported face of a rotary valve, composed of a substantially stationary sealing plate having a passage therethrough and in resilient contact with said face, and a ring provided with a passage therethrough and separate from said plate and in resilient contact with said face through the passage of said plate, whereby said ported face is sealed except at the passage through said ring.

21. A sealing construction for the transverse ported face of a rotary valve, composed of a plate and a ring both in resilient contact with said transverse face, the plate having a passage in which the ring is received.

22. A sealing construction for the transverse ported face of a rotary valve, composed of a ported plate in resilient contact with said transverse face, and passage means extending through said plate and in resilient contact with said transverse face, whereby said ported face is sealed except at said passage means.

23. A sealing construction for the transverse ported face of a rotary valve, composed of a ported plate in resilient contact with said transverse face and communication means extending through said plate and in resilient contact with said transverse face, whereby said face is covered except through said communication means.

24. A rotary valve having a transverse ported face, a ported plate in resilient contact with said transverse face, communication means extending through said plate and in resilient contact with said transverse face, whereby said face is covered except through said communication means, the rotary valve having a second ported face substantially parallel to the first named ported face and provided with a passage connecting said faces, and passage means in resilient contact with the second ported face whereby it is covered except through said passage means.

25. A rotary valve having a transverse ported face, a plate provided with communication means therethrough and in resilient contact with said transverse face, communication means separate from said plate and extending therethrough and in resilient contact with said transverse face whereby said face is covered except through said communication means.

26. A rotary valve for an internal combustion engine cylinder comprising an adjacently placed transverse faced rotary valve member having exhaust and intake passages opening to both of its transverse faces, a sealing plate having communication means therethrough in resilient contact with one of the transverse faces of the valve, and passage means separate from said plate and in resilient contact with the valve through the communication means of said plate.

In testimony whereof I affix my signature.

ROLLAND S. TROTT.